US009231462B2

(12) United States Patent
Hunter et al.

(10) Patent No.: US 9,231,462 B2
(45) Date of Patent: Jan. 5, 2016

(54) MINIMIZATION OF TORQUE RIPPLE

(75) Inventors: Ian W. Hunter, Lincoln, MA (US);
Serge LaFontaine, Lincoln, MA (US);
Timothy A. Fofonoff, Cambridge, MA (US)

(73) Assignee: NUCLEUS SCIENTIFIC, INC., Lincoln, MA (US)

( * ) Notice: Subject to any disclaimer, the term of this patent is extended or adjusted under 35 U.S.C. 154(b) by 661 days.

(21) Appl. No.: 13/587,467

(22) Filed: Aug. 16, 2012

(65) Prior Publication Data
US 2013/0093265 A1 Apr. 18, 2013

Related U.S. Application Data

(60) Provisional application No. 61/524,089, filed on Aug. 16, 2011.

(51) Int. Cl.
*H02K 57/00* (2006.01)
*H02K 99/00* (2014.01)
(Continued)

(52) U.S. Cl.
CPC .............. *H02K 57/006* (2013.01); *H02K 7/075* (2013.01); *H02K 41/0356* (2013.01);
(Continued)

(58) Field of Classification Search
CPC ..... H02K 7/14; H02K 7/075; H02K 41/0356; H02K 57/006
USPC ............ 310/12.15, 20, 22–24, 30, 33–35, 38, 310/80; 290/1 R; 318/400.23, 686, 687
IPC ....................................................... H02K 57/00
See application file for complete search history.

(56) References Cited

U.S. PATENT DOCUMENTS 1,886,040 A * 11/1932 Moodyman ............ H02K 7/065
310/24
4,618,808 A * 10/1986 Ish-Shalom ............. H02P 25/08
318/685

(Continued)

FOREIGN PATENT DOCUMENTS

| CN | 101388589 A | 3/2009 |
| EP | 1098429 A2 | 5/2001 |
| GB | 2344223 A | 5/2000 |

OTHER PUBLICATIONS

International Search Report and Written Opinion issued by the European Patent Office as the International Searching Authority in corresponding International Application No. PCT/US12/51131, mailed Sep. 4, 2013 (14 pgs.).

(Continued)

*Primary Examiner* — John K Kim
(74) *Attorney, Agent, or Firm* — Wilmer Cutler Pickering Hale and Dorr LLP

(57) ABSTRACT

An electric motor including: a first and second linear actuator, each linear actuator including a first and second coil respectively, a rotational shaft, a cam assembly mounted on the rotational shaft for translating linear movement of the two linear actuators to rotational movement of the rotational shaft, a controller programmed to generate during operation a first and second drive signal for first coil and second coil respectively, wherein the first drive signal causes the first linear actuator to generate a first torque on the rotational shaft that varies periodically over a complete rotation of the shaft and the second drive signal causes the second linear actuator to generate a second torque on the rotational shaft that varies periodically over a complete rotation of the shaft, and wherein the sum of the first and second torques produces a total torque that is substantially constant throughout the complete rotation of the shaft.

14 Claims, 19 Drawing Sheets

(51) Int. Cl.
*H02K 41/035* (2006.01)
*H02K 7/075* (2006.01)
*H02K 7/14* (2006.01)

(52) U.S. Cl.
CPC ....... *B60L 2220/44* (2013.01); *B60L 2240/423* (2013.01); *B60L 2240/425* (2013.01); *B60L 2240/429* (2013.01); *B60L 2270/142* (2013.01); *B60L 2270/145* (2013.01); *H02K 7/14* (2013.01); *Y02T 10/641* (2013.01)

(56) References Cited

U.S. PATENT DOCUMENTS

| | | | |
|---|---|---|---|
| 4,684,834 A * | 8/1987 | Hartman, Sr. | H02K 7/065 310/24 |
| 5,276,372 A * | 1/1994 | Hammer | H02K 55/00 310/16 |
| 5,345,206 A | 9/1994 | Morcos | |
| 6,278,204 B1 * | 8/2001 | Frenette | H02K 7/075 310/24 |
| 6,294,891 B1 * | 9/2001 | McConnell | G05B 5/01 318/560 |
| 6,575,078 B1 | 6/2003 | Wright et al. | |
| 7,950,356 B2 * | 5/2011 | Hyde | F02B 63/04 123/46 R |
| 2007/0120432 A1 | 5/2007 | Vaden et al. | |
| 2008/0067968 A1 * | 3/2008 | Binnard | H02P 25/06 318/687 |
| 2009/0090334 A1 * | 4/2009 | Hyde et al. | 123/51 R |
| 2009/0091196 A1 | 4/2009 | Cooper | |
| 2011/0108339 A1 | 5/2011 | Hunter | |
| 2013/0093265 A1 * | 4/2013 | Hunter et al. | 310/12.15 |

OTHER PUBLICATIONS

European Search Report issued on EP12807528, dated Oct. 16, 2015 (7 pages).

* cited by examiner

MINIMIZATION OF TORQUE RIPPLE

CROSS-REFERENCE TO RELATED APPLICATIONS

This application claims the benefit or priority to U.S. Provisional Application No. 61/524,089, filed Aug. 16, 2011, the entire disclosure of which is hereby incorporated by reference in its entirety.

TECHNICAL FIELD

This invention relates generally to the control of electric motors and more specifically to the control of linear Lorentz-Type actuator motors.

BACKGROUND OF THE INVENTION

Lorentz-type motors exploit the basic principle that a charged particle moving in a magnetic field experiences a force in a direction perpendicular to the direction of movement. Stated mathematically: F=qvXB, where F is force, q is the charge of the charged particle, v is the instantaneous velocity of the particle, and B is the magnetic field. So, if a current is flowing through a wire and a magnetic field is applied in perpendicular direction, the wire experiences a force trying to move it sideways.

A simple configuration that harnesses this principle is a coil encircling a magnetic core made of permanent magnets. The coil, referred to as the actuator, is arranged to be capable of sliding back and forth along the length of the magnetic core or magnetic stator. In that configuration, flowing a current though the coil results in a force on the coil pushing it in one direction along the length of the magnetic core. Reversing the direction of current flow causes the coil to move in the opposite direction. The magnitude of the current determines the strength of the force. And the shape of the current waveform determines how the force changes over time. With such an arrangement, by applying an appropriate current waveform to the coil, one can make the coil move back and forth along the magnetic core in a controlled manner. The controlled movement of the actuator can, in turn, be used to perform work.

DETAILED DESCRIPTION

The subject of this application is the design and operation of a hub-mounted motor assembly so as to minimize torque ripple. The hub-mounted motor is a linear Lorentz-type actuator motor. Before discussing the design and operation of the hub-mounted motor assembly, a brief review of the linear Lorentz-type actuator motor will be presented. A more detailed discussion can be found in U.S. Ser. No. 12/590,495, entitled "Electric Motor," and incorporated herein in its entirety by reference.

The Linear Lorentz-Type Actuator Motor

Figure 1A:
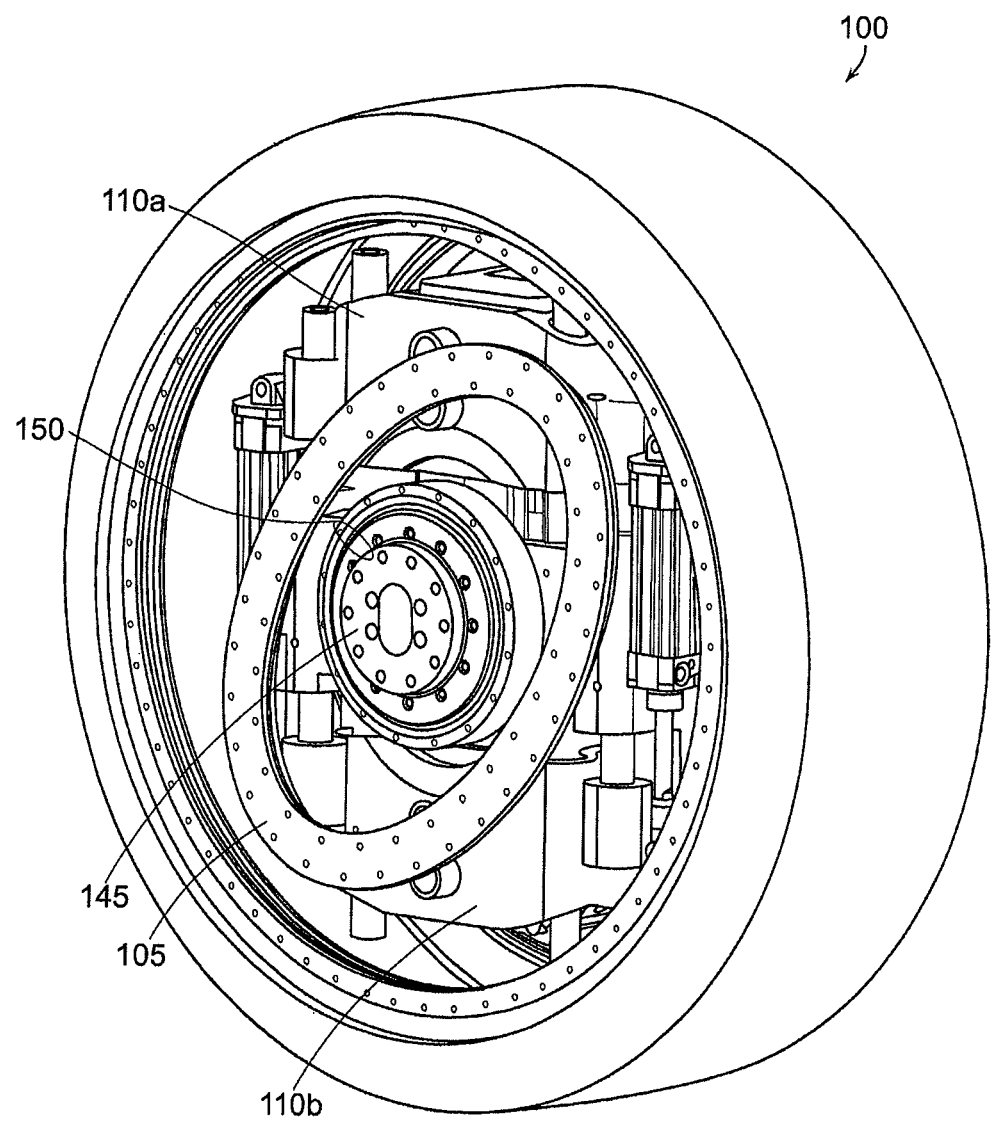
FIGS. 1A-1B illustrate a rotary motor in a wheel.

The linear Lorentz-type actuator motor is a rotary device 100 that is mounted inside a wheel on a vehicle, as illustrated in FIG. 1A. Rotary device 100 includes a magnetic stator assembly 120, opposed electromagnetic actuators 110a, 110b, and a linear-to-rotary converter (e.g., oval-shaped cam) 105. Rotary device 100 is attached to the chassis of a vehicle, for example, at a point on the far side of the wheel (not shown). Rotary device 100 is attached to the wheel via cam 105 using a circular support plate, for example, which has been removed to show the inside of the wheel. Such a plate is attached to both the rim of the wheel and cam 105 using fasteners, such as bolts. The wheel and cam support plate rotate relative to a hub 145 about a bearing 150.

Figure 1B:
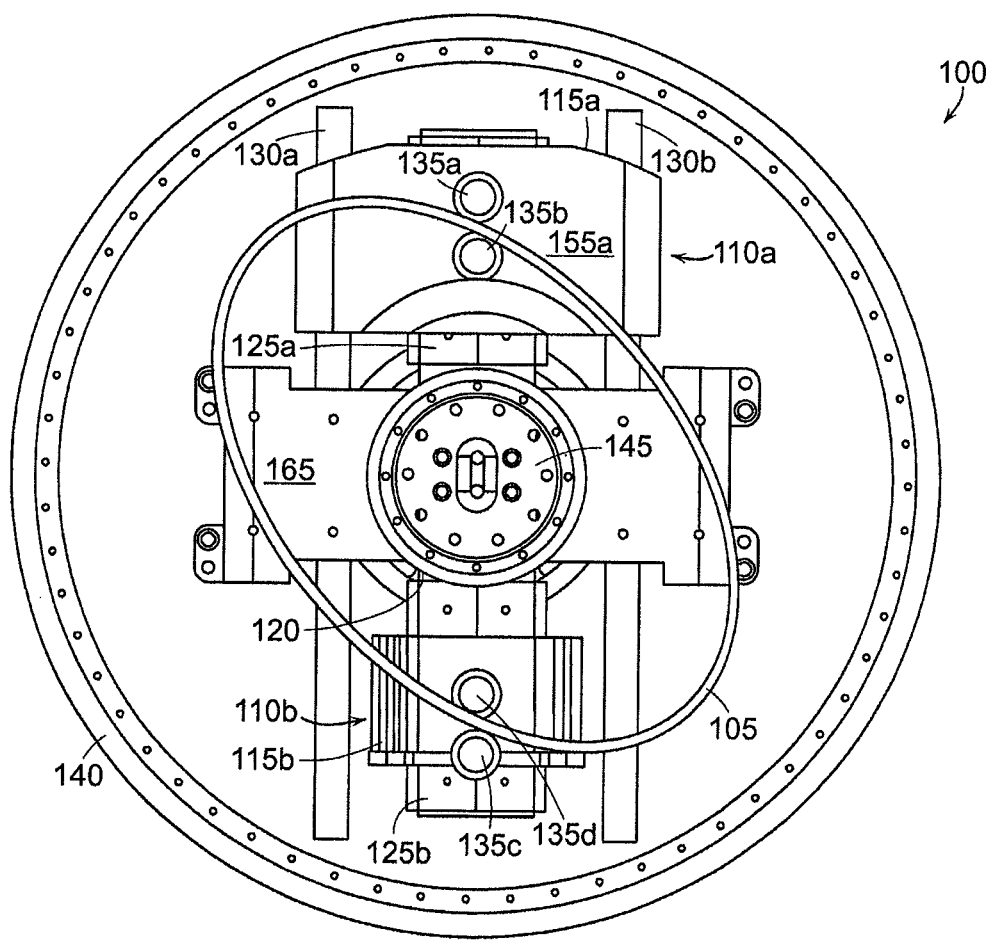

FIG. 1B shows rotary device 100 from the side of the wheel 140 with the tire and some other components removed. The core of rotary device 100 includes cam 105, two opposed electromagnetic actuators 110a, 110b, and a magnetic stator assembly 120. Electromagnetic actuators 110a, 110b each house a coil 115a, 115b that encircles magnetic stator assembly 120. Magnetic actuators 110a, 110b is arranged to reciprocate relative to magnetic stator assembly 120 when an appropriate drive signal is applied to coils 115a, 115b. One electromagnetic actuator 110a is shown having a housing 155a surrounding its coil 115a and the other electromagnetic actuator 110b is shown with its housing removed to show its coil 115b.

Magnetic stator assembly 120 depicted in FIG. 1B is oriented vertically and includes a plurality of magnetic stators 125a, 125b, each of which includes multiple individual permanent magnets oriented so that their magnetic moments are perpendicular to the axis of magnetic stator assembly 120. When current is applied to coils 115a, 115b of the electromagnetic actuators 110a, 110b (e.g., alternating current), actuators 110a, 110b are forced to move vertically along magnetic stator assembly 120 due to the resulting electromagnetic forces (i.e., the Lorentz forces). As is well known, when a coil carrying an electrical current is placed in a magnetic field, each of the moving charges of that current experiences what is known as the Lorentz force, and collectively they create a net force on the coil. The direction of movement and force generated is controlled by the polarity and amplitude of the current induced in the coil.

Rotary device 100 also includes a plurality of shafts 130a, 130b, coupled to a bearing support structure 165. Electromagnetic actuators 110a, 110b slide along the shafts using, for example, linear bearings. Attached to each electromagnetic actuator 110a, 110b is a pair of followers 135a-d that interface with cam 105 to convert their linear motion to rotary motion of the cam. To reduce friction, followers 135a-d freely rotate so as to roll over the surfaces of cam 105 during the operating cycle. Followers 135a-d are attached to electromagnetic actuators 110a, 110b via, for example, the actuators' housings. As electromagnetic actuators 110a, 110b reciprocate, the force exerted by followers 135a-d on cam 105 drives cam 105 in rotary motion.

Figure 1C:
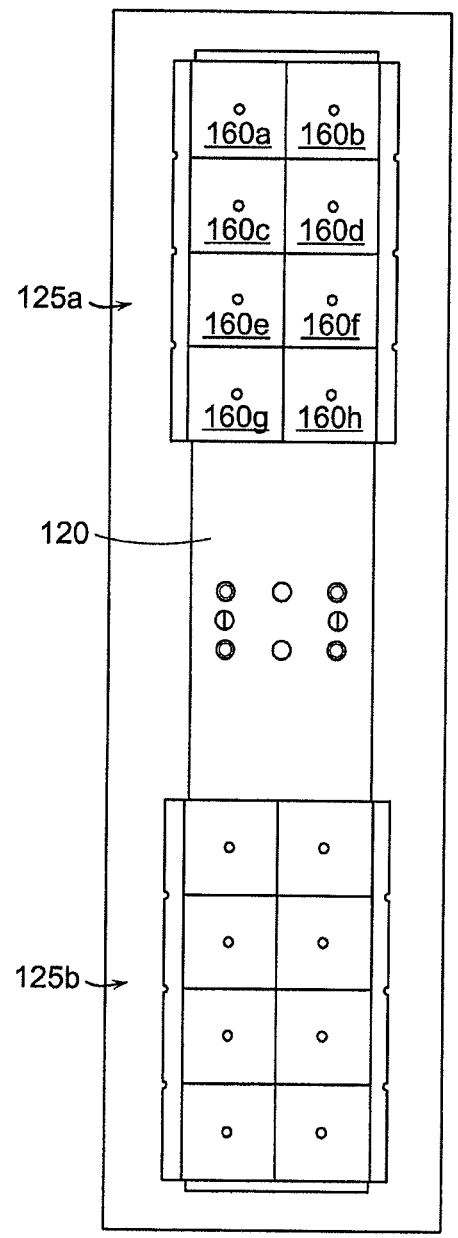
FIG. 1C illustrates a magnetic stator assembly.

FIG. 1C illustrates magnetic stator assembly 120 with two magnetic stators 125a, 125b. Magnetic stators 125a, 125b each include multiple magnets. For example, magnetic stator 125a includes, on one end surface portion, eight magnets 160a-h. All of the magnets 160 have their magnetic moments oriented perpendicular to the surface on which they are mounted and in the same direction.

Figure 2A:
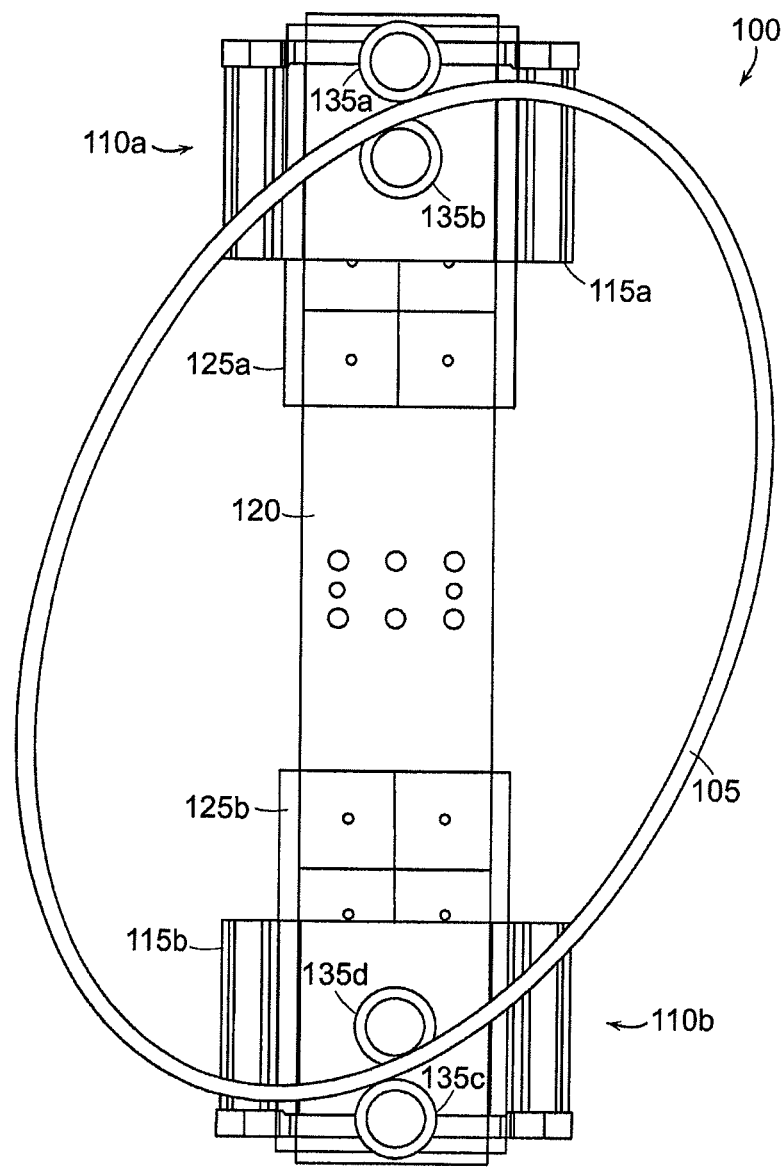
FIGS. 2A-2C illustrate components of the rotary motor of FIG. 1 in various stages of motion.
Figure 2:
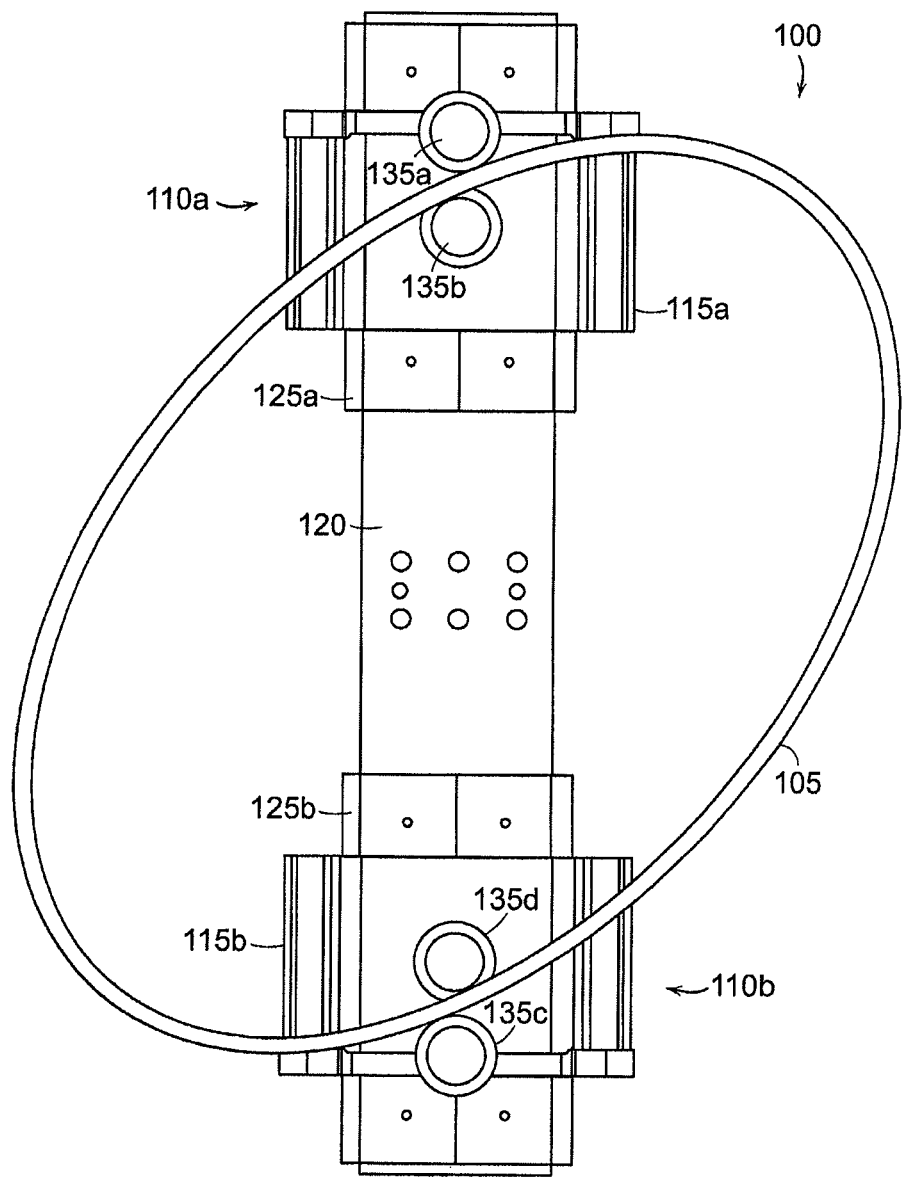
FIG. 2D illustrates an exemplary shape of a cam.
Figure 2:
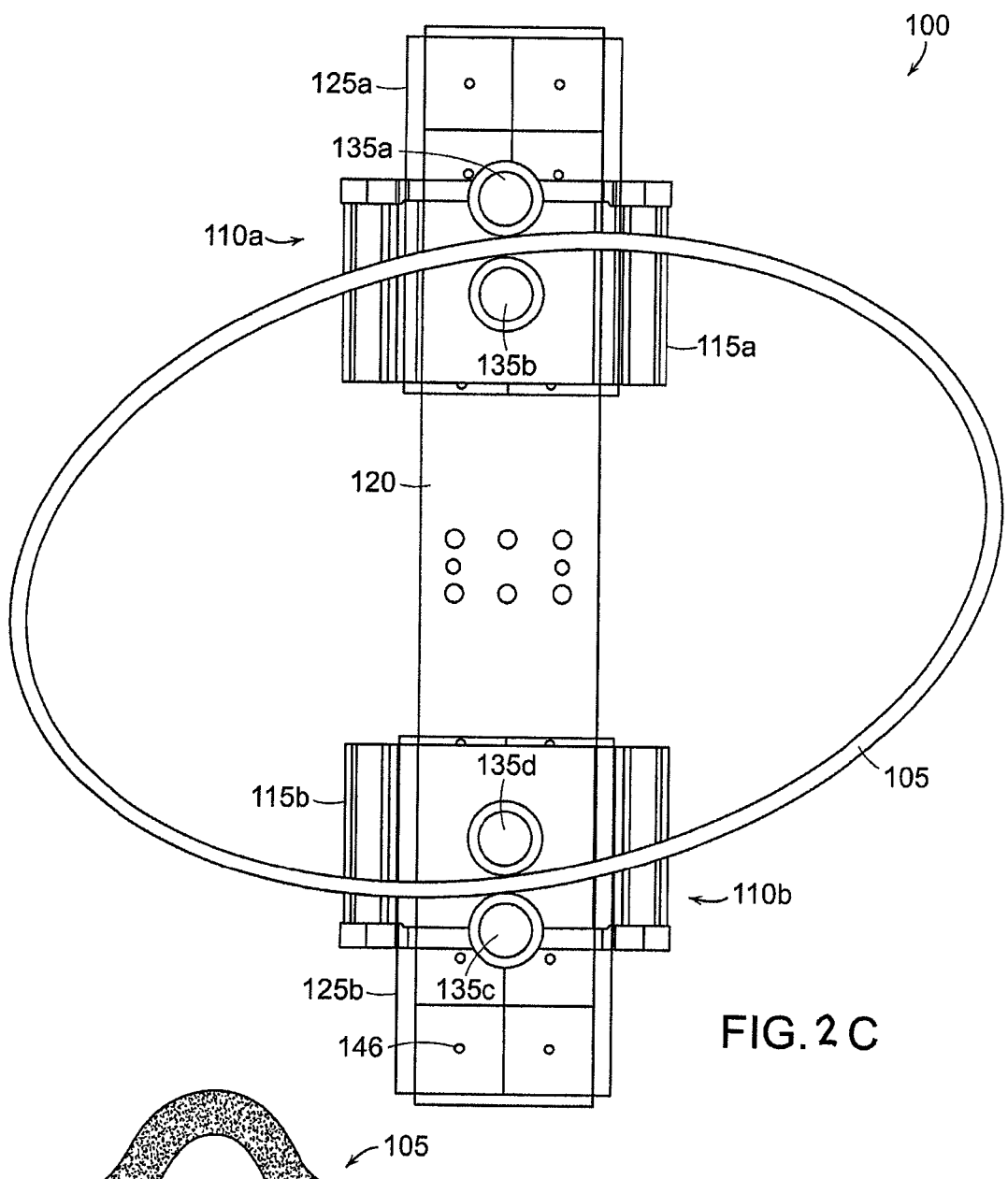
Figure 2:
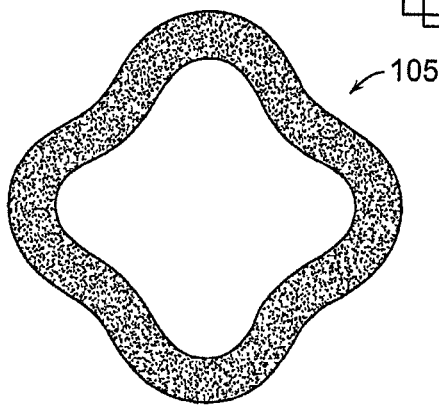

FIGS. 2A-C illustrate components of rotary device 100 in action, including the rotary device's electromagnetic actuators 110a, 110b (with associated coils 115a, 115b and followers 135a-d) and cam 105 moving relative to the magnetic stator assembly 120 (including associated magnetic stators 125a, 125b). The rim, the wheel, and the housings by which the followers are attached to the coils are not shown in these figures. As illustrated by FIGS. 2A-C, the reciprocal movement of the coils 115a, 115b in opposition drives cam 105 to rotate, which, in turn, causes a wheel attached to cam 105 to rotate. Coils 115a, 115b are shown in FIG. 2A as being at almost their furthest distance apart. FIG. 2B shows that as coils 115a, 115b move closer to each other, coils 115a, 115b drive cam 105 to rotate in a clockwise direction, thereby causing any attached wheel to also rotate clockwise. In the example device, the force exerted on cam 105 is caused by the outer followers 135a, 135c squeezing-in on cam 105. FIG. 2C shows that coils 115a, 115b are even closer together causing further clockwise movement of cam 105.

After coils 115a, 115b have reached their closest distance to each other and cam 105, in this case, has rotated ninety degrees, coils 115a, 115b begin to move away from each other and drive cam 105 to continue to rotate clockwise. As coils 115a, 115b move away from each other, inner followers 135b, 135d exert force on cam 105 by pushing outward on cam 105.

It is noted that cam 105 is shown in the figures as an oval shape, but it may have a more complex shape, such as, for example, a shape having an even number of lobes, as illustrated in FIG. 2D. The sides of each lobe may be shaped in the form of a sine wave, a portion of an Archimedes spiral, or some other curve, for example. The number of lobes determines how many cycles the coils must complete to cause the cam to rotate full circle. A cam with two lobes will rotate full circle upon two coil cycles. A cam with four lobes will rotate full circle upon four coil cycles. Additionally, more lobes in a cam results in a higher torque.

Analysis of Torque

The motor consists of circular disk with an outer cam and inner cam. Two cam followers linked to a coil can create a radial force on the cam. The force exerted by the cam followers in turn creates a torque on the disk.

The idealized equation for the Torque $T_c(\theta)$ generated by the cam follower is given by the following equation:

$$T_c(\theta) = F_c(\theta) \cdot \frac{dR_c(\theta)}{d\theta} \qquad \text{Eq. 1}$$

where $F_c(\theta)$ is the radial force generated by the cam follower, and $R_c(\theta)$ is the distance of the cam follower from the center of the disk. As noted above, in the motor, the force is generated from a current running in a coil and interacting with a magnetic field.

Figure 3:
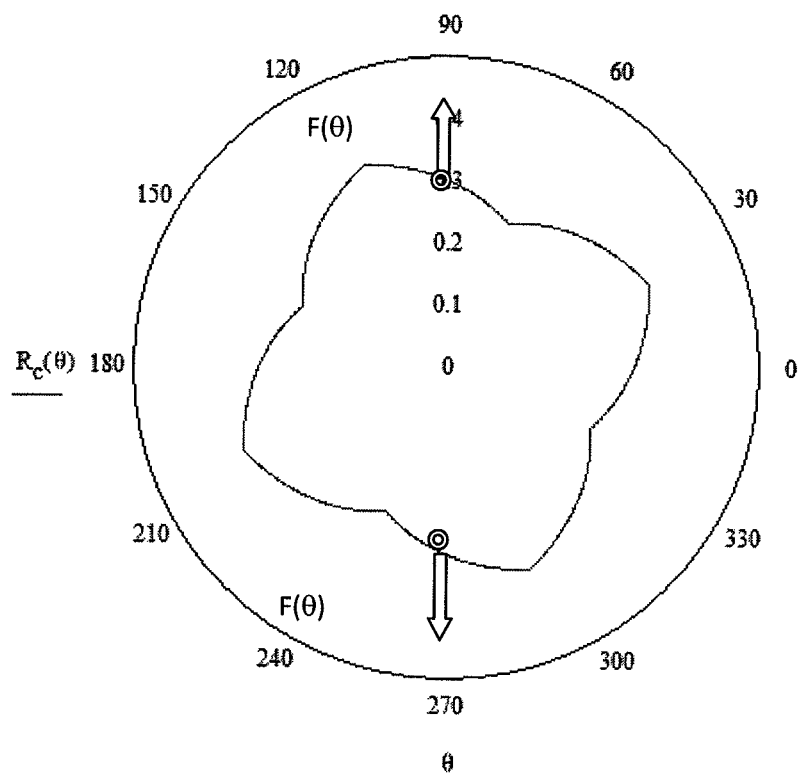
FIG. 3 is a cam profile based on an Archimedes Spiral

If the force is constant throughout a half stroke and the slope defining the position of the cam follower as a function of the wheel angle is also constant, that produces a torque that is constant throughout the cycle. The two dimensional shape of the cam would then be as depicted in FIG. 3.

Figure 4:
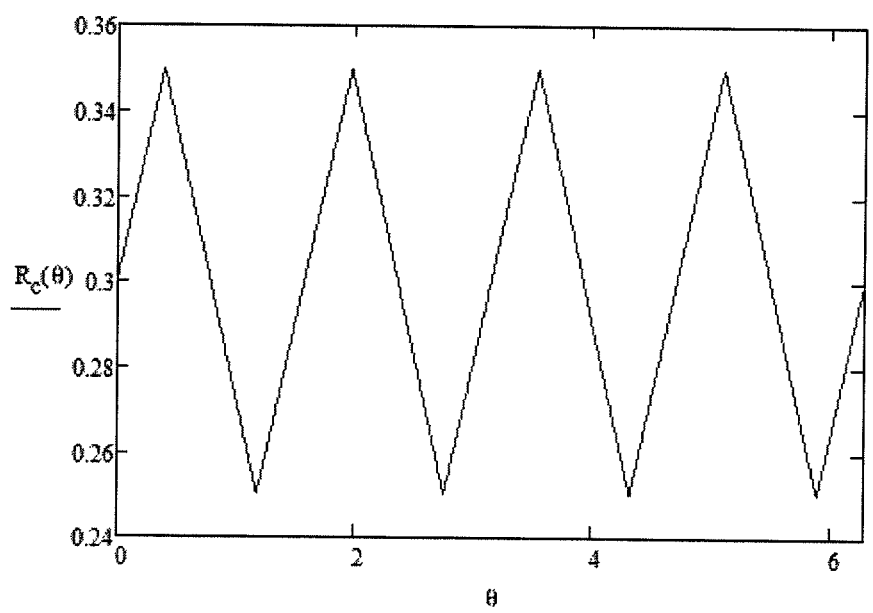
FIG. 4 is a plot of cam radial position as a function of angle.

In FIG. (1), $\theta$ is the position (rotation) of the wheel in radians and the disk has four lobes. The cam follower exerts a vertical force as indicated by the arrow. The position of the cam in polar coordinates is given by the curve shown in FIG. 4.

Although this cam profile easily lends itself to a drive signal that yields a constant torque, it presents two major drawbacks: the need to instantaneously change the coil velocity at the end of the cam motion and the need to instantaneously change the current that generates the force exerted by the cam.

The approximate equation giving the force required to accelerate and decelerate the coil is:

$$F_r = M_c \cdot \left[ \frac{d^2}{d\theta^2} R_c(\theta) \cdot \left(\frac{d}{dt}\theta\right)^2 + \frac{d}{d\theta} R_c(\theta) \cdot \frac{d^2}{dt^2}\theta \right] \qquad \text{Eq. 2}$$

where $M_c$ is the mass of the coil. At the extremes of the stroke motion, the term $$\frac{d^2 R_c(\theta)}{d\theta^2}$$

is theoretically infinite, which means in practice that the coil would undergo an unacceptably high shock due to the abrupt deceleration and acceleration.

Instantaneously changing the current also presents technical challenges, given that the current flows through a coil with a significant inductance. A linear approximation of the voltage required to change the current in the coil is given by:

$$V_c(t) = R_c \cdot I_c(t) + L_c \cdot \frac{d}{dt} I(t) + V_{emf}(t) \qquad \text{Eq. 3}$$

where $V_c(t)$ is the voltage required across the coil as a function of the required change in coil current $I_c(t)$, $R_c$ is the coil resistance, $L_c$ is the coil inductance and $V_{emf}(t)$ is the back electromotive force generated by the coil as it moves through a changing magnetic field. Here again, given the discontinuity in the current the voltage across the coil would tend to infinity.

Figure 5:
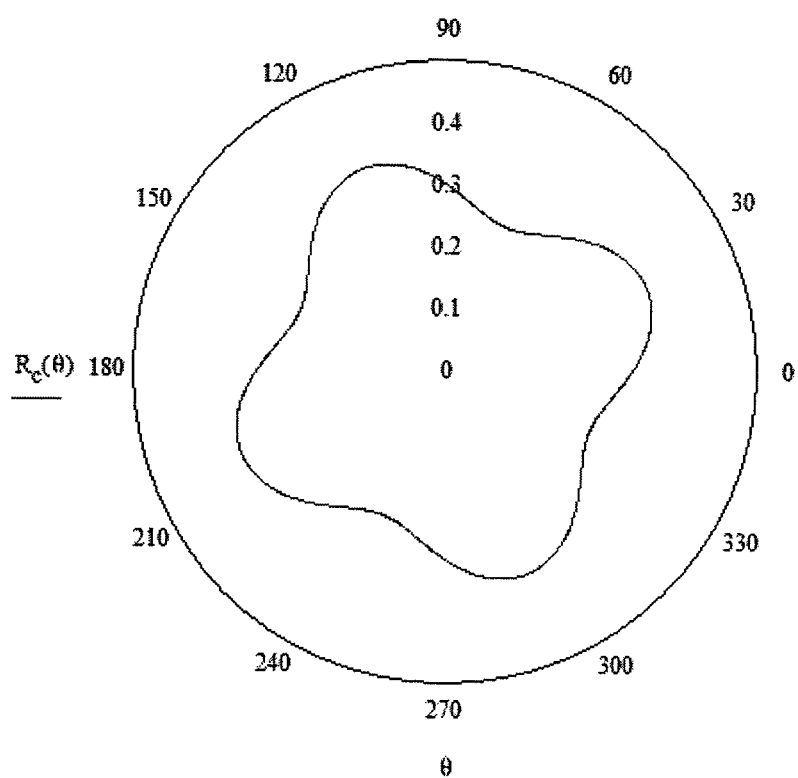
FIG. 5 is a sinusoidal cam profile.
Figure 6:
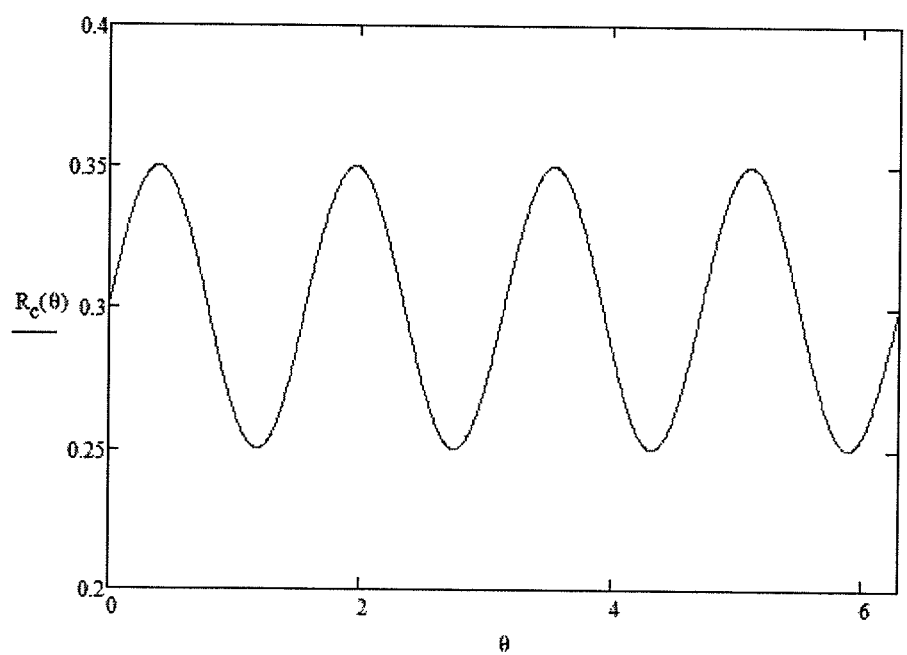
FIG. 6 is a plot of cam radial position as a function of angle for the cam shown in FIG. 5.

One partial solution is to change the cam profile such that its second derivative is finite and continuous at all points, i.e., it has a third order derivative. One example of such a cam profile would be a sinusoidal shape. In such a case, the cam profile would be given by the equation:

$$R_c(\theta)=R_O+A_c\cdot\sin(n_1\cdot\theta) \qquad \text{Eq. 4}$$

where $R_O$ is the circle around which the cam evolves (mean position), $A_c$ is the cam amplitude and $n_1$ is the number of lobes or number of strokes per revolution. The cam profile then looks like what is shown in FIG. 5. And in polar coordinates, the cam profile is shown in FIG. 6.

In this case the force to be generated by the coil is given by:

$$F_c(\theta) = \frac{T_c(\theta)}{\frac{d}{d\theta}R_c(\theta)} \qquad \text{Eq. 5}$$

However, the derivative of the cam position $R_c(\theta)$ is null at the end of the strokes, hence the required force would also diverge to infinity. This remains true for any cam profile. If there is only one cam, the corollary is that it would not be self-starting if the initial position occurs when the cam follower is at the end of a stroke.

Using multiple cams such that their null points are spaced apart circumvents the problem. In the simplest example, there would be two cams on a disk, each on opposite side.

An Exemplary Embodiment

Figure 7A:
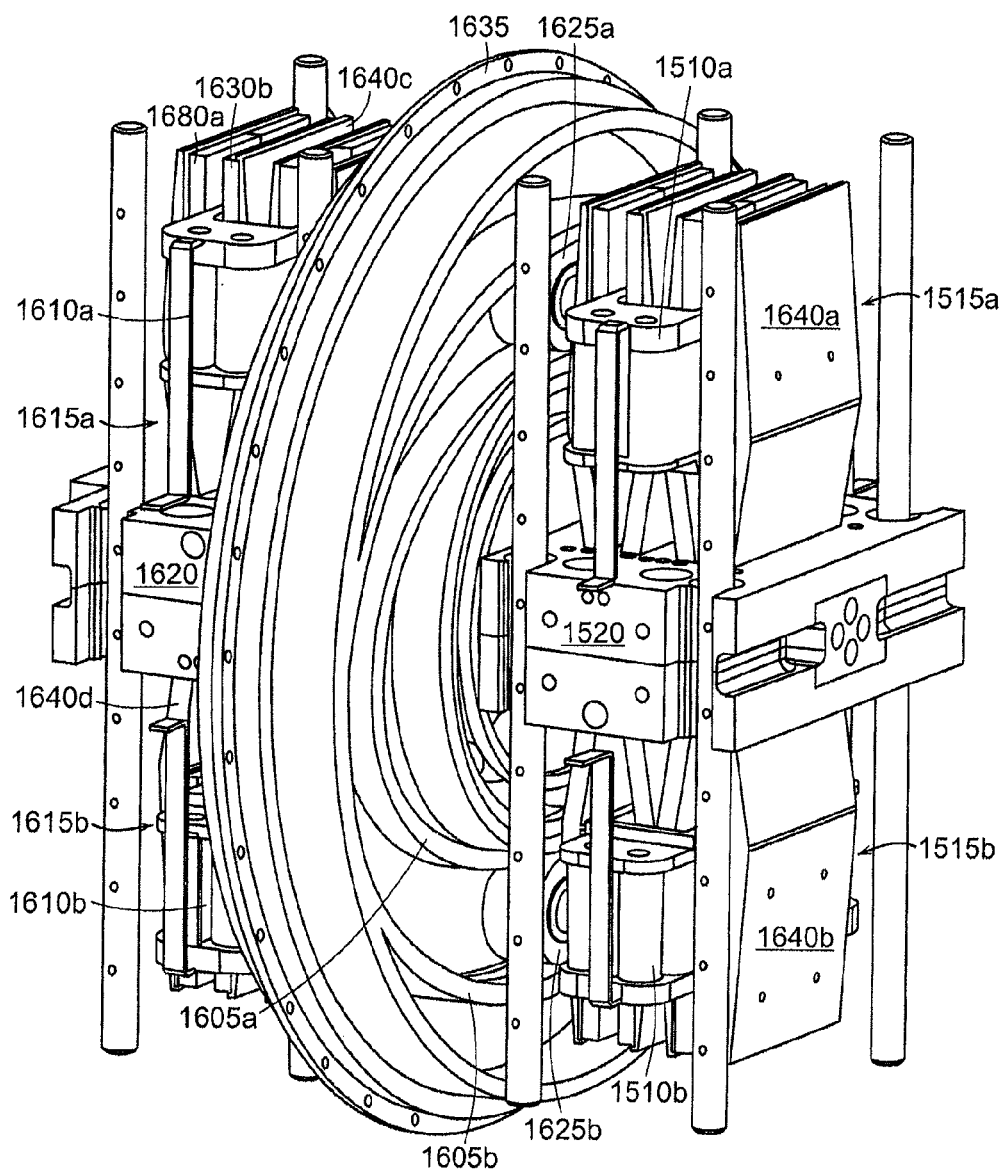
FIGS. 7A-7B illustrate an arrangement of two hub motors for one wheel.
Figure 7B:
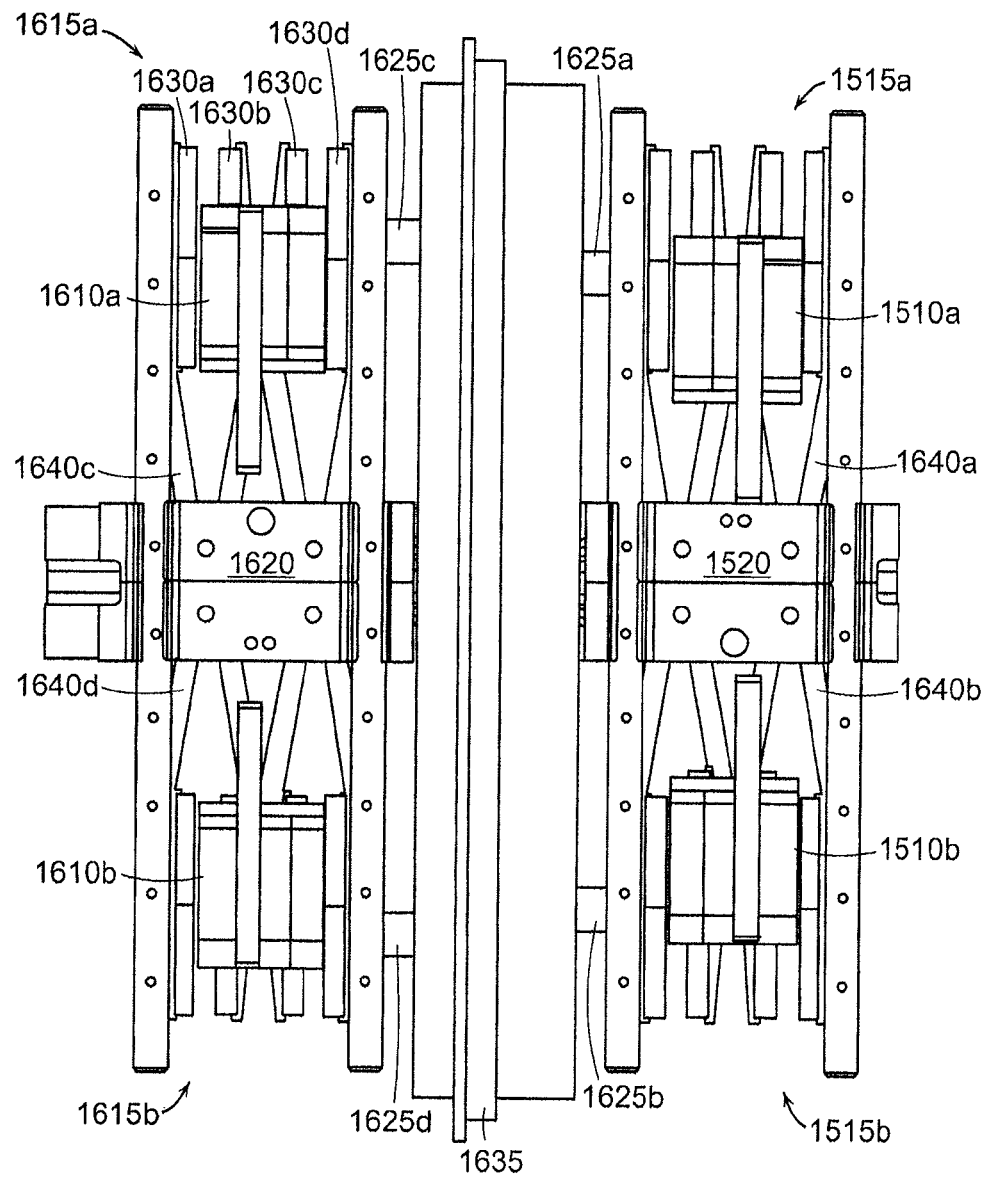

A wheel which implements this approach is shown in FIGS. 7A-B. In this case the tire of the wheel, and some other components, have been removed for clarity. There are two rotary devices 1500 and 1600, one mounted on each side of a central disc 1635. The rotary devices are similar to the rotary devices described above. Rotary device 1500 includes a pair of electromagnetic actuators 1510a, 1510b, and a magnetic stator assembly 1520. Similarly, rotary device 1600 includes a pair of electromagnetic actuators 1610a, 1610b, and a magnetic stator assembly 1620. Each of magnetic stator assemblies 1520, 1620 includes two magnetic stators 1515a, 1515b, 1615a, 1615b, which include magnetic flux return paths 1640a-d and magnets (e.g., 1630a, 1630b). The housings surrounding the coils of the electromagnetic actuators 1510a, 1510b, 1610a, 1610b are not shown. Each coil reciprocates along four arrays of magnets, which, as described above, may include multiple magnets. Two of the magnet arrays are located inside the coil (e.g., inner magnetic stator component 1630b) and two are located outside the coil (e.g., outer magnetic stator component 1630a). Each set of magnets are mounted to a magnetic flux return path 1640a-d.

The disc 1635 includes two cams, one on either side of the disc 1635. In this example, each cam of the device is in the form of a grove that includes an inner surface 1605a and an outer surface 1605b. Coupled to electromagnetic actuators 1510a and 1510b are two pairs of followers 1625a, 1625b, the different followers of each pair interfacing with a respective surface 1605a, 1605b of the cam. Electromagnetic actuators 1610a and 1610b are similarly coupled to followers. As the coils move towards each other, one of the followers of each electromagnetic actuator 1510a, 1510b exerts force on the inner surface 1605a of the cam. As the coils move away from each other, the other follower exerts force on the outer surface 1605b of the cam.

FIG. 7B illustrates a different view of the rotary devices. It should be apparent that each pair of electromagnetic actuators (pair 1510a, 1510b and pair 1610a, 1610b) are at different phases of reciprocation. This is because, in the example device, the cams on either side of the disc 1635 are rotationally offset from each other by, for example, forty-five degrees. This helps to prevent the actuators from stopping at a point on the cams from which it would be difficult to again start. Thus, if one pair of actuators stops on a "dead-spot" of its respective cam, the other pair of actuators would not be at a dead-spot. FIG. 7B also illustrates an arrangement of the coils and magnetic stator components. For example, magnetic stators components 1630b and 1630c are located inside the coil of actuator 1610a, and magnetic stators components 1630a and 1630d are located outside the coil.

Figure 8A:
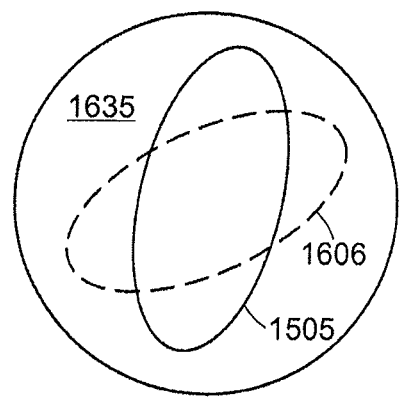
FIGS. 8A-8B illustrate views of two rotationally offset cams.

FIG. 8A illustrates two rotationally offset cams 1505, 1606. The cams 1505, 1606 are part of or are mounted on a disc 1635. One cam 1505 is on one side of the disc 1635, and the other cam 1606 is on the opposite side, as indicated by the dashed line. In some devices the cam may be offset by forty-five degrees, for example. The cams 1505, 1606 have an even number of lobes, e.g. 2, 4, 6 etc. Cams having two lobes are offset by 45 degrees. Cams having four lobes are offset by 22.5 degrees.

Figure 8B:
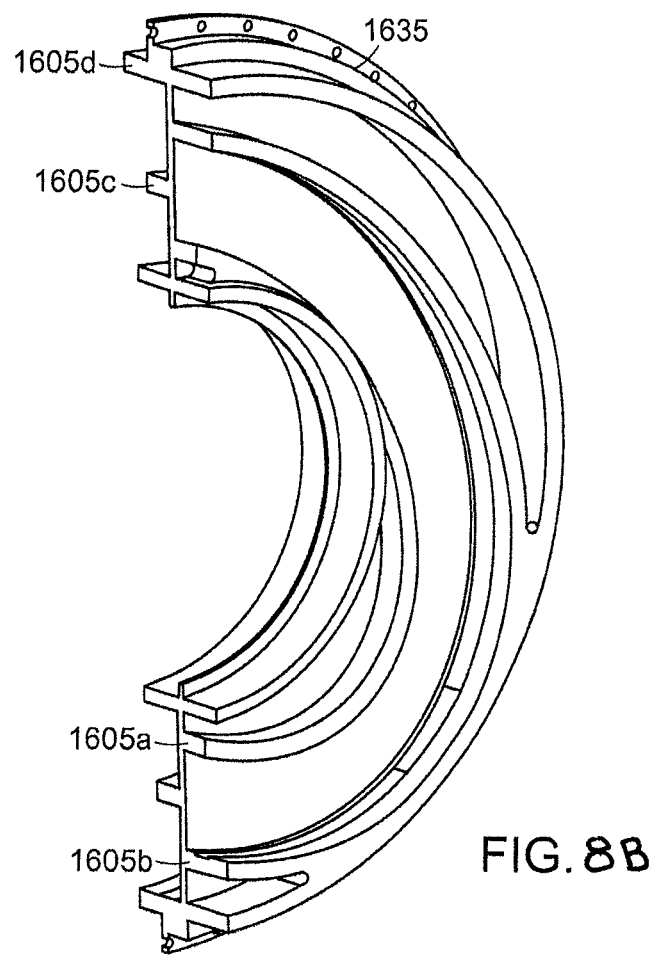

FIG. 8B illustrates a vertical cross-section of a disc 1635 with two rotationally offset cams, each having in inner surface 1605a, 1605c and an outer surface 1605b, 1605d. Due to the offset, the inner surfaces 1605a, 1605c are not in line with each other. Likewise, the outer surfaces 1605b, 1605d are also not in line with each other.

Figure 9:
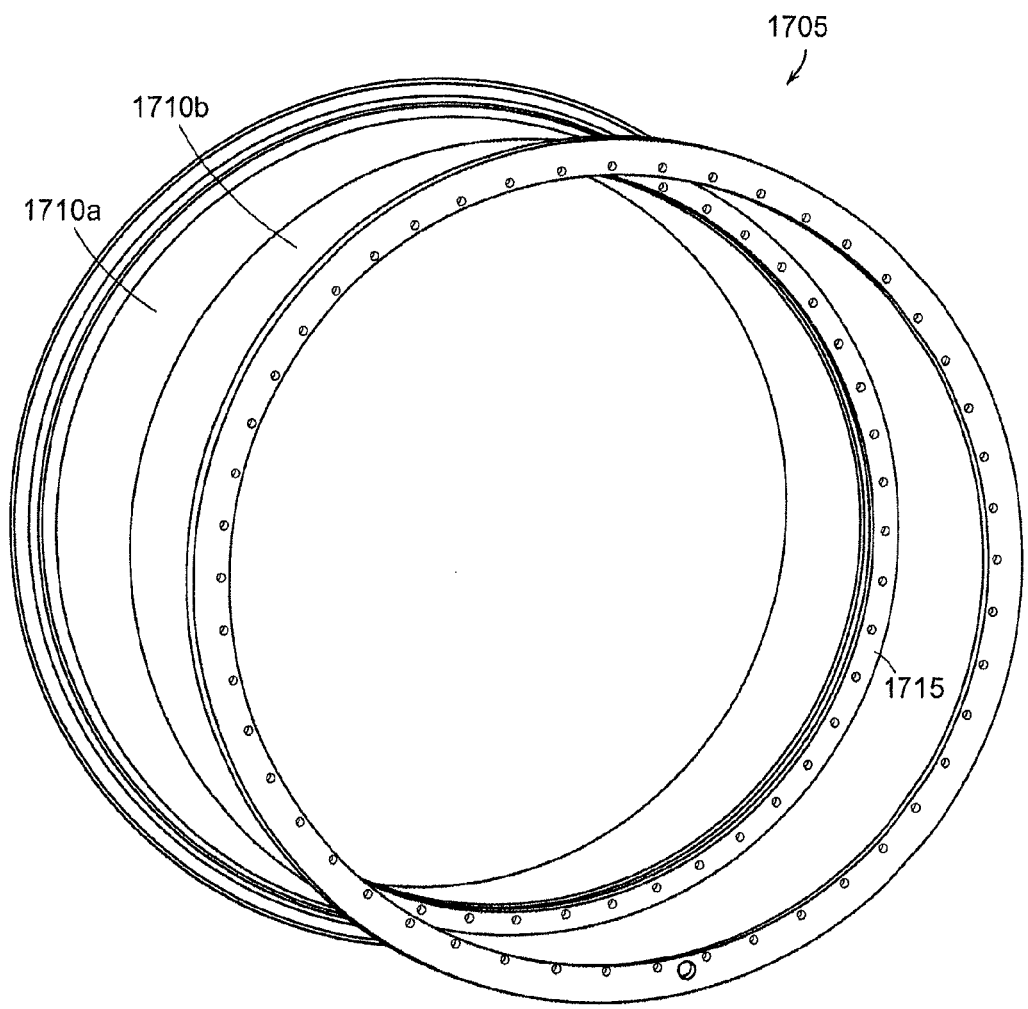
FIGS. 9A-9B illustrate a disc of an example rotary device coupled to a rim of a wheel.
Figure 9B:
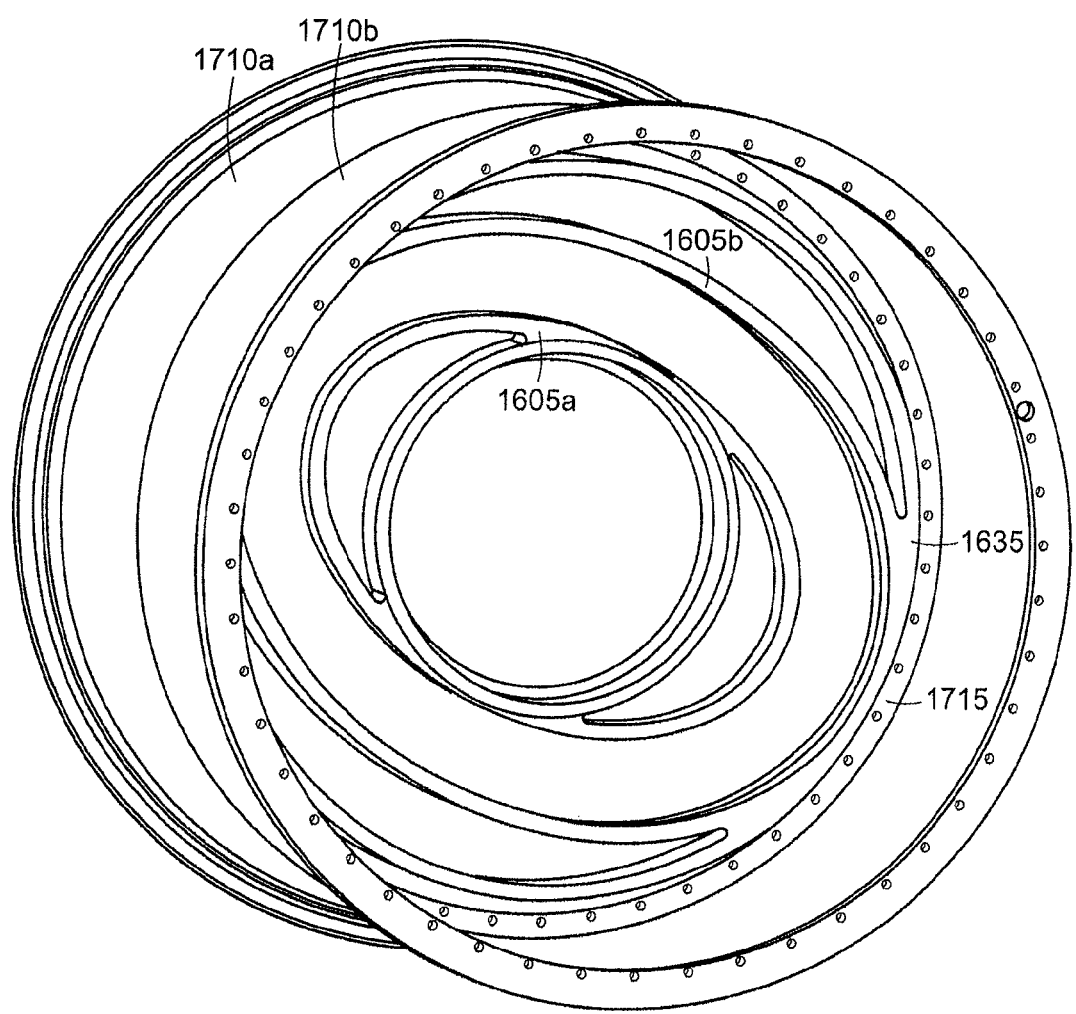

FIG. 9A illustrates how the disc 1635 of the example rotary device is coupled to the rim 1705 of a wheel. The rim 1705 consists of one piece to which the disc 1635 is affixed using fasteners, such as bolts, along an inner ring 1715. Alternatively, the rim 1705 may include two parts 1710a, 1710b that bolt together along ring 1715. When fastened together, the two parts 1710a, 1710b form a full rim 1705 with inner ring 1715. A tire is then be mounted to the rim 1705. FIG. 9B shows how the disc 1635 is fastened to the inner ring 1715 of the disc 1635.

Minimizing Torque Ripple

Figure 10:
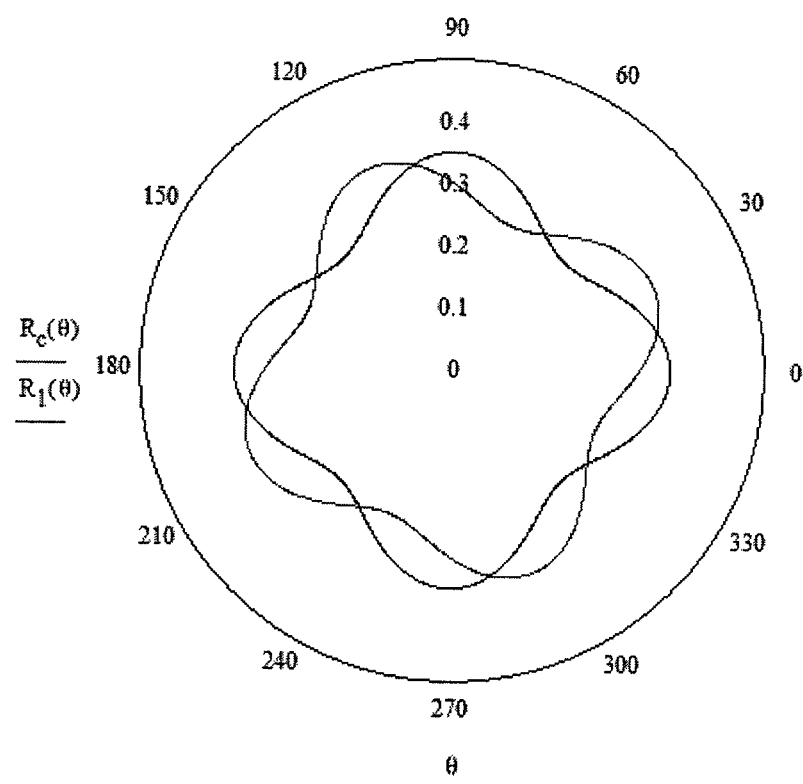
FIG. 10 illustrate two cam profiles in quadrature.

Returning to the description of the technique for minimizing torque ripple, we direct the reader's attention to an example using two four lobe cams, which is illustrated in FIG. 10.

Note that the profiles are not mirror images but are in quadrature and that they consist of the same basic profile $R_c(x)$ but "shifted" with respect to each other. Assuming that $n_c$ is the number of lobes in the cam, i.e. the number of times that a basic function $R_c(x)$ is repeated within one full circle, and that the derivative of the cam profile is given by $\Psi_c(n_c\cdot\theta)$, the equation for the torque provided by the summation of the torques $\Phi(\theta)$ of the individual cams would be:

$$T=\Phi(n_c\cdot\theta)+\Phi(n_c\cdot\theta+\Delta) \qquad \text{Eq. 6}$$

$$T=F_c(n_c\cdot\theta)\cdot\Psi(n_c\cdot\theta)+F_c(n_c\cdot\theta+\Delta)\cdot\Psi(n_c\cdot\theta+\Delta) \qquad \text{Eq. 7}$$

And typically $\Delta$ corresponds to one quarter of a lobe, i.e.

$$\Delta = \frac{\pi}{2}.$$

This leads to the following question: what is the family of functions $\Phi(\theta)=F_c(\theta)\cdot\Psi_c(\theta)$ such that total torque is constant (i.e., ripple free) when at least two out-of-phase cams and actuators are used. This equation implies that the function $\Phi(\theta)$ has a periodicity of $2\cdot\Delta$:

$$\Phi(\theta)=T-\Phi(\theta+\Delta) \qquad \text{Eq. 8}$$

$$\Phi(\theta+\Delta)=T-\Phi(\theta+2\cdot\Delta) \qquad \text{Eq. 9}$$

Substituting:

$$\Phi(\theta)=T-(T-\Phi(\theta+2\cdot\Delta))=\Phi(\theta+2\cdot\Delta) \quad \text{Eq. 10}$$

Which is as required, i.e. the function $\Phi(\theta)$ is periodic, with a period that is double that of the period of one full cam cycle. This still leaves the ensemble of functions quite large. For reasons of symmetry, it is reasonable to require that:

$$\Phi(\theta)=\Phi(-\theta) \quad \text{Eq. 11}$$

And we can also assume that the cam reaches its extremum at $\theta=0$ and $\theta=\Delta$. Hence, the class of functions $\Phi(\theta)$ that we are seeking has the following properties:
1. $\Phi(\theta)=0$
2. $\Phi(\Delta)=T_{max}$ where $T_{max}$ is the maximum torque
3. $\Phi(\theta)$ is symmetrical with respect to the $\theta=0$ vertical axis
4. $\Phi(\theta)$ is symmetrical with respect to the point $(\Delta/2, T_{max}/2)$.
5. $\Phi(\theta)$ is continuous.

Figure 11:
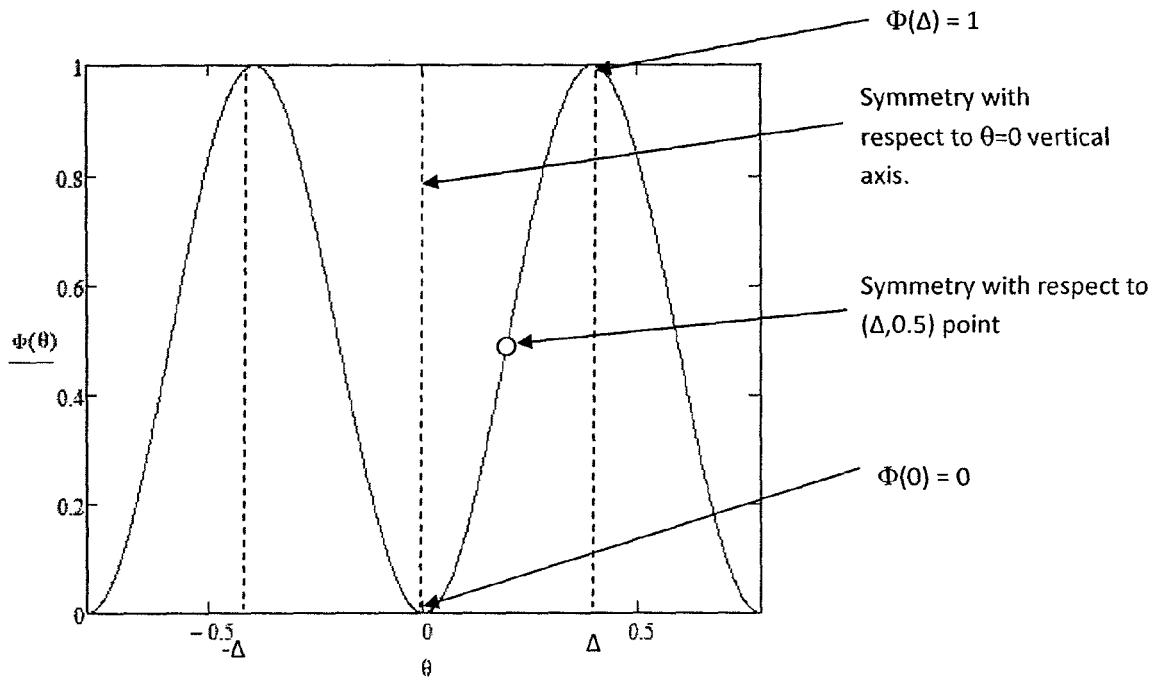
FIG. 11 illustrate the symmetry features of a torque function.

The general shape of this function is given in FIG. 11.

We also know that the function $\Phi(\theta)$ is the product of two other functions, $F_c(\theta)$ and $\Psi(\theta)$, where $\Psi(\theta)$ must have a first order derivative, such that the cam profile given by:

$$R_c(\theta)=\int\Psi(\theta)d\theta \quad \text{Eq. 12}$$

Intuitively it would also be desirable that the functions $F_c(\theta)$, $R_c(\theta)$ and $\Psi(\theta)$ have the same symmetry. Therefore one reasonable question to ask is would there be a function such that $F_c(\theta)$ and $\Psi(\theta)$ are the same function? In this case:

$$T=\Psi^2(n_c\cdot\theta)+\Psi^2(n_c\cdot\theta+\Delta) \quad \text{Eq. 13}$$

which is the basic equation of a right triangle.

Here the components in quadrature can be viewed as the sides of a right triangle, such that one is a sine of an angle and the other one the cosine of the angle:

$$\cos^2(\varphi) = \Psi^2(n_c \cdot \theta) \quad \text{Eq. 14}$$

$$\cos(\varphi + \Delta) = \cos\left(\varphi + \frac{\pi}{2}\right) \quad \text{Eq. 15}$$
$$= \cos(\varphi)\cos\left(\frac{\pi}{2}\right) - \sin(\varphi)\sin\left(\frac{\pi}{2}\right)$$
$$= -\sin(\varphi)$$

$$\therefore \cos^2(\varphi + \Delta) = \sin^2(\varphi) \quad \text{Eq. 16}$$

In conclusion, if the shape of the cam is a sine function, its derivative is a cosine function, its derivative is a sine function, and if the current waveform is also a sine function then the two components in quadrature sum up to a constant torque with no ripple.

In principle, there is an infinite number of functions $F_c(\theta)$, $R_c(\theta)$ and $\Psi(\theta)$ leading to a constant torque. In practice, the choice is rather limited, given that we must have:

$$F_c(\theta) = \frac{\Phi(\theta)}{\Psi(\theta)} \quad \text{Eq. 17}$$

And when both $\Phi(\theta)$ and $\Psi(\theta)$ tend to zero, the ratio must also converge to zero. We also require to a first order derivative. It becomes a non-trivial exercise to find other functions besides the sinusoidal type function to meet these criteria, and they typically end up very close to a trigonometric function. However, in the modern day of microprocessor based digital control where computation time is a prime consideration such alternate functions might have a benefit.

Figure 12:
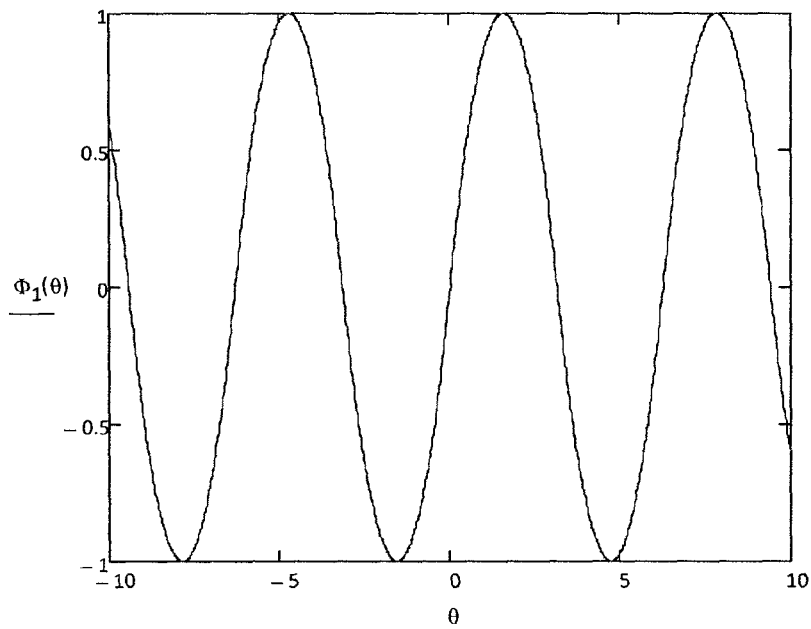
FIG. 12 illustrates a piecewise quadratic torque function.
Figure 13:
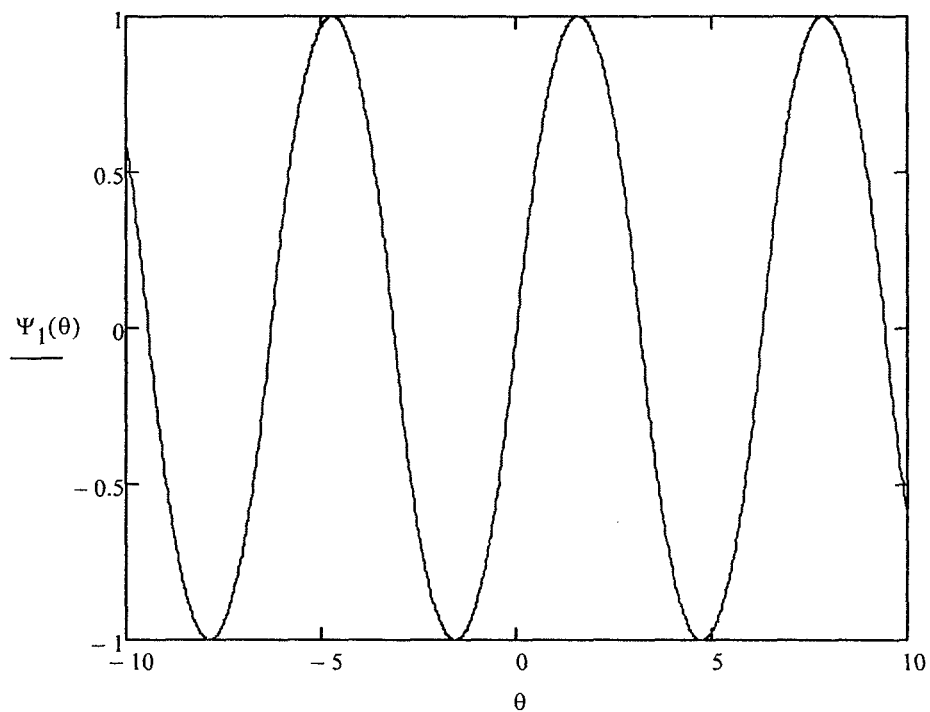
FIG. 13 illustrates a piecewise quadratic profile for the first derivative of the cam profile.

One of the simplest examples of an alternate approach would be to use piece-wise quadratic functions for $\Phi_1(\theta)$ and $\Psi_1(\theta)$, as given in this MathCAD recursive representation, omitting for the time being the number of lobes in the equations:

$$\Phi_1(\theta) := \begin{vmatrix} z \leftarrow |\theta| \\ z \leftarrow \mod(z, \pi) \\ y \leftarrow \frac{8}{\pi^2} \cdot z^2 \text{ if } z \leq \frac{\pi}{4} \\ \text{otherwise} \\ \quad y \leftarrow 1 - \Phi_1\left(\frac{\pi}{2} - z\right) \text{ if } z \leq \frac{\pi}{2} \\ \quad y \leftarrow \Phi_1(\pi - z) \text{ otherwise} \\ y \leftarrow y \end{vmatrix} \quad \text{Eq. (18)}$$

where $\Phi_1(\theta)$ is shown in FIG. 12.

$$\Psi_1(x) := \begin{vmatrix} z \leftarrow |x| \\ z \leftarrow \mod(z, 2\pi) \\ y \leftarrow 1 - \frac{4}{\pi^2} \cdot \left(\frac{\pi}{2} - z\right)^2 \text{ if } z \leq \frac{\pi}{2} \\ \text{otherwise} \\ \quad y \leftarrow \Psi_1(\pi - z) \text{ if } z \leq \pi \\ \quad y \leftarrow -\Psi_1(z - \pi) \text{ otherwise} \\ y \leftarrow y \cdot \text{sign}(x) \end{vmatrix} \quad \text{Eq. (19)}$$

where $\Psi_1(\theta)$ is shown in FIG. 13.

Figure 14:
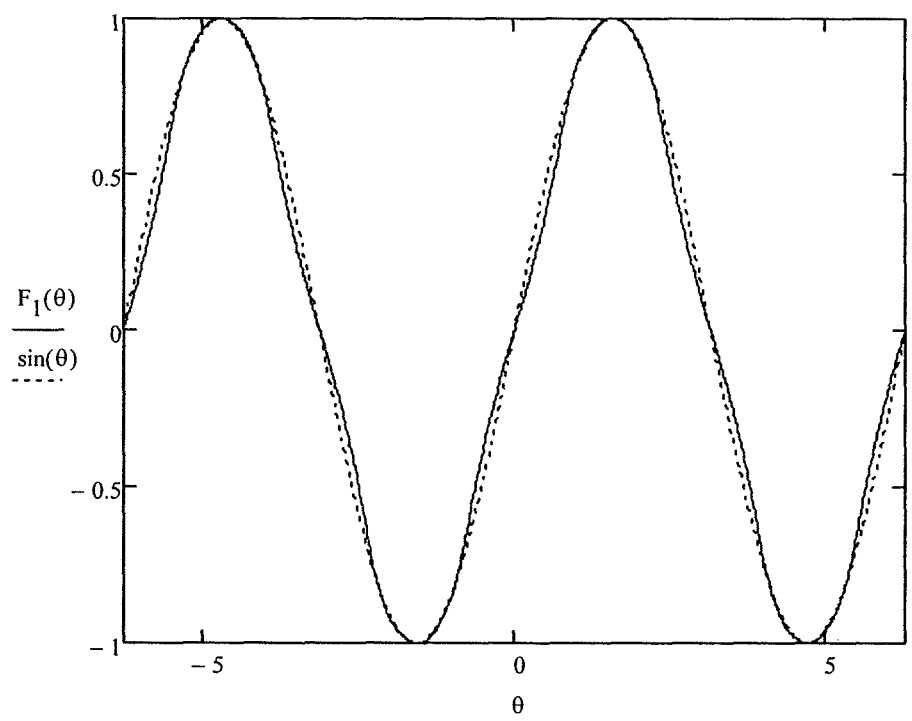
FIG. 14 illustrates a non-trigonometric force function compared to a trigonometric force function.

The resulting force profile $F_1$ calculated from the ratio of $\Phi_1$ to $\Psi_1$ is outlined in FIG. 14, and compared to a trigonometric function.

Figure 15:
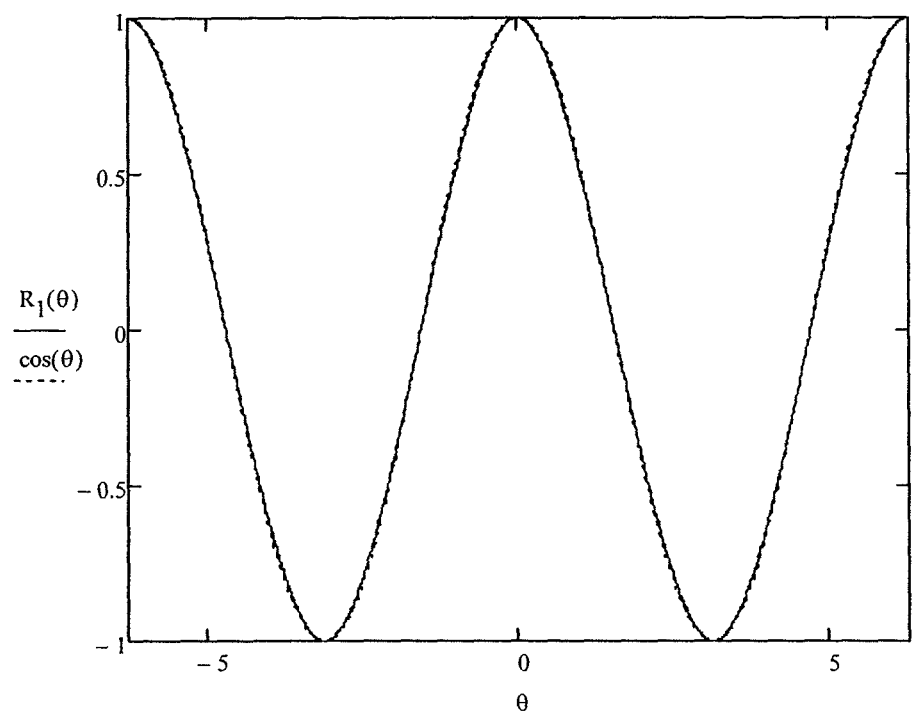
FIG. 15 illustrates a non-trigonometric cam profile compared to a trigonometric cam profile.

Finally, the CAM profile $R_1$ is computed from the integral of $\Psi_1$ and compared to a trigonometric function in FIG. 15.

Although difficult to prove, it is to be expected that all CAM shapes and force profiles that are well behaved in terms of symmetry and smoothness would all be very close in shape to trigonometric functions. Only two CAMs in quadrature were analyzed here, the same approach could be used for other even numbers of CAMS.

In actual practice, although it is easy to generate a CAM with a precise triangular function, it is more difficult to generate a force profile that is a sinusoidal. For an idealized Lorentz force actuator assuming a constant magnetic induction B, this would translate in generating an exact current profile with a sinusoidal function. However, in practice the magnetic induction B is not constant and depends on the geometry of the permanent magnets used to generate the field. Furthermore, the field generated by magnets depends on the temperature and is also influenced by the current flowing in the motor coil. All of these effects must be carefully modeled to generate a current that truly minimizes ripple.

Figure 16:
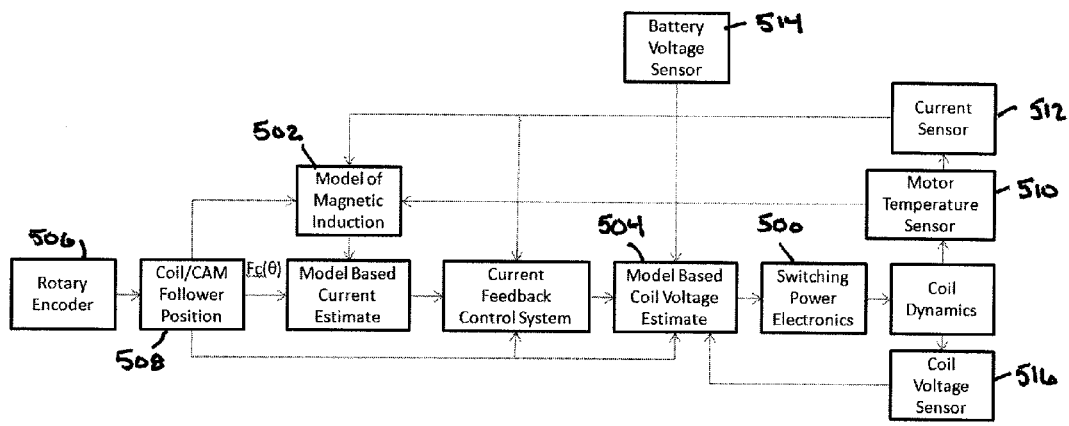
FIG. 16 is an exemplary control system for providing constant torque.

A typical control system is depicted in FIG. 16. It includes switching power electronics 500 which supplies a pulse width modulated drive signal to the coils in the motor to produce the desired torque and speed. The operation of switching power electronics 500 is controlled based on models of the motor including a model 502 of the magnetic induction of the motor (i.e., the magnetic field seen by the coil as a function of the position of the coil, the current in the coil, and the temperature of the coil) and a model 504 which enables one to determined the voltage of a pulse width modulated signal that is necessary to produce the desired drive current in the coils. Input for the models comes from a rotary encoder 506 which indicates the angular position of the cam or wheel, a conversion module 508 that converts the angular position into a position of the coil or cam follower, and various sensors in the motor supplying information about the motor's operating conditions. Note that the model changes depending on operating conditions and some the model needs to take these into account. The various sensors include a motor temperature sensor 510, a current sensor 512, a battery voltage sensor 514, and a coil voltage sensor 516.

From a wheel rotary encoder 506, the angular and radial position of the coil and cam follower are calculated. From the cam follower position, the desired force to be generated by the coil is calculated from a function $F_c(\theta)$. The desired current required to produce this force is equal to the current in the coil times the magnetic induction. Since the magnetic induction B is not exactly uniform, it has to be estimated from model 502 using the motor temperature, coil current, and relative position of the coil with respect to the permanent magnets.

The desired current is converted to a pulse modulation width. This is done in two steps. First from the model of the coil dynamics, a voltage required across the coil to obtain the desired current in the coil is calculated. Then, a model of the power electronics is required to calculate the switching duty cycle based on the desired voltage, the supply voltage, the actual current in the coil and the voltage across the coil.

So far the control is all feed forward model based. However, the models have a certain level of inaccuracy, so feedback is used to correct between the desired current and measured current.

Figure 17:
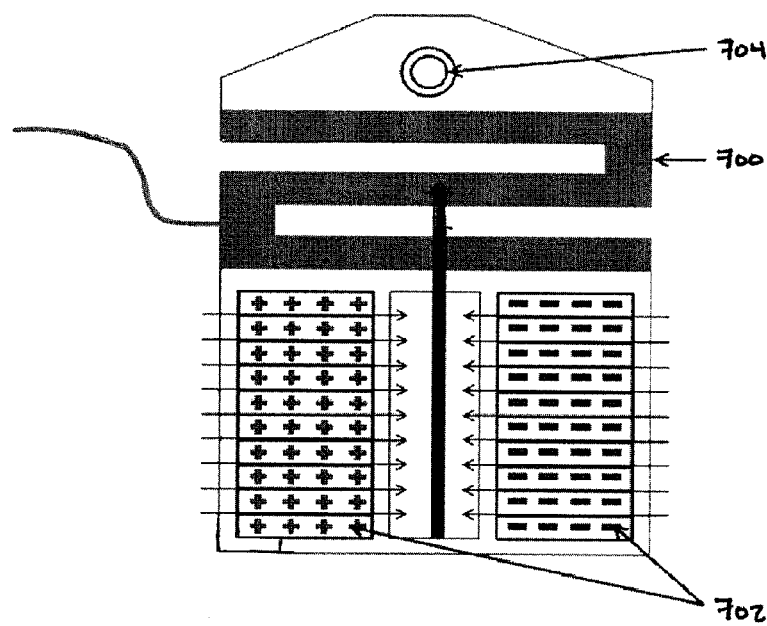
FIG. 17 shows a load cell for directly measuring the Lorentz force.
Figure 18:
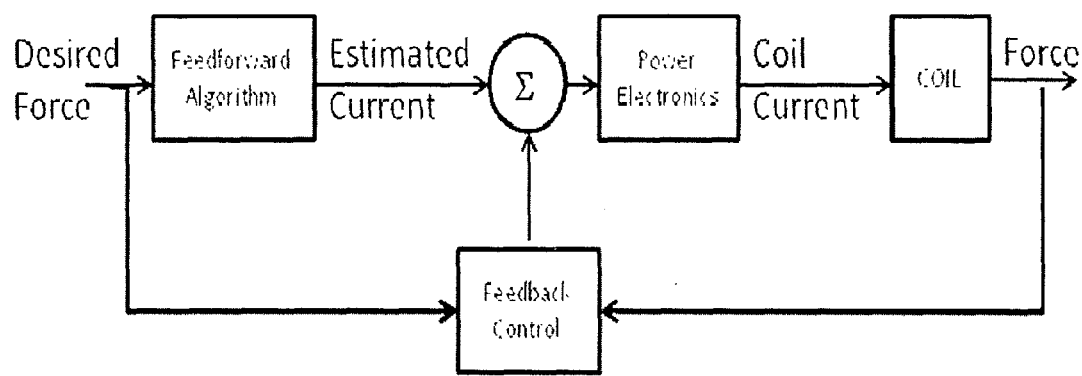
FIG. 18 is an exemplary control system which employs feedback for force profile generation.

An alternative approach to generating the desired force profile is by measuring the force that is generated and directly controlling that force using a feedback control on current, as summarized in FIGS. 17 and 18.

FIG. 17 illustrates how the Lorentz force generated by the coil can be directly measured. A load cell 700 is inserted between the coil 702 and the cam follower 704. The cam follower itself can be subject to large off-axis forces from the reaction with the cam. However, force transducers can be designed to be largely insensitive to such lateral forces. Therefore, an accurate measurement of the axial force can be obtained from the load cell and then used in various control algorithms to adjust the current such that the required force profile is generated.

FIG. 18 illustrates one of the many alternative control strategies that can be used to obtain the required force profile. The algorithms described above to estimate the current needed to get the desired force could be used in a feedforward manner. Then, the error between the desired force and measured coil force would be feed to some other feedback control system which uses that measurement to make current corrections in order to obtain the desired force profile. The advantage of the feedback control approach is that it will tend to be more stable than a purely feed forward approach.

Other embodiments are within the following claims.

What is claimed is:

1. An electric motor comprising:
    a first linear actuator including a first coil;
    a second linear actuator including a second coil;
    a rotational shaft;
    a cam assembly mounted on said rotational shaft for translating linear movement of the first and second linear actuators to rotational movement of the rotational shaft; and
    a controller programmed to generate during operation a first drive signal for the first coil and a second drive signal for the second coil, wherein the first drive signal causes the first linear actuator through interacting with the cam assembly to generate a first torque on the rotational shaft that varies periodically over a complete rotation of the shaft and the second drive signal causes the second linear actuator through interacting with the cam assembly to generate a second torque on the rotational shaft that varies periodically over the complete rotation of the shaft,
    wherein the controller is programmed to generate the first and second drive signals to produce a total torque that is substantially ripple free constant throughout the complete rotation of the shaft, the total torque comprising a sum of the first torque and the second torque.

2. The electric motor of claim 1, further comprising:
    a first cam follower assembly coupling the first linear actuator to the cam assembly; and
    a second cam follower assembly coupling the second linear actuator to the cam assembly,
    wherein the first cam follower assembly is arranged to ride along a first cam surface within the cam assembly, said first cam surface having a first profile over 360 degrees of rotation,
    wherein the second cam follower assembly is arranged to ride along a second cam surface within the cam assembly, said second cam surface having a second profile over 360 degrees of rotation, and
    wherein the first and second profiles as well as the first and second drive signals are selected to generate the substantially ripple free torque.

3. The electric motor of claim 2, wherein the first profile is described by n cycles of a trigonometric function, wherein n is an even integer.

4. The electric motor of claim 3, wherein the second profile is described by n cycles of said trigonometric function.

5. The electric motor of claim 4, wherein n equals 4.

6. The electric motor of claim 5, wherein said trigonometric function is a sine function.

7. The electric motor of claim 6, wherein the first profile is shifted in phase relative to the second profile by $$\frac{\pi}{2n}$$

radians.

8. The electric motor of claim 2, wherein the first profile follows a curve that is continuous over 360 degrees and that has a first derivative that is continuous over 360 degrees.

9. The electric motor of claim 2, wherein each of the first and second profiles has a period of $$\frac{360}{n}$$

degrees and each of the first and second torques has a period of $$\frac{180}{n}$$

degrees, and wherein n is an even integer.

10. The electric motor of claim 9 wherein n equals 4.

11. The electric motor of claim 6, wherein the first and second profiles are aligned in phase and wherein the first and second linear actuators are shifted in orientation relative to each other by $$\frac{\pi}{2n}$$

radians.

12. The electric motor of claim 2, wherein the first and second cam surfaces are separate surfaces.

13. The electric motor of claim 2, wherein the first and second cam surfaces are the same surface.

14. The electric motor of claim 2, wherein:
   a first derivative of the first profile is represented by $\psi(n_c \cdot \theta)$;
   a first derivative of the second profile is represented by $\psi(n_c \cdot \theta + \Delta)$;
   a force generated by the first actuator is represented by $F_c(n_c \cdot \theta)$:
   a force generated by the second actuator is represented by $F_c(n_c \cdot \theta + \Delta)$; and
   wherein $\theta$ is an angle of rotation of the shaft, $n_c$ is an even integer representing a number of cycles of the first and second profiles over a complete rotation of the shaft, $\Delta$ is a phase shift between the first and second profiles, and wherein $F_c(n_c \cdot \theta) \cdot \Psi(n_c \cdot \theta) + F_c(n_c \cdot \theta + \Delta) \cdot \Psi(n_c \cdot \theta + \Delta)$ is constant as a function of $\theta$.

* * * * *